US009116264B2

(12) United States Patent
Makuta et al.

(10) Patent No.: US 9,116,264 B2
(45) Date of Patent: Aug. 25, 2015

(54) LIGHT GUIDE PLATE PRODUCING METHOD, DIE STRUCTURE, TRANSFER MOLDING APPARATUS, LIGHT GUIDE PLATE, AREA LIGHT SOURCE DEVICE, LIQUID CRYSTAL DISPLAY DEVICE, AND MOBILE DEVICE

(71) Applicant: OMRON Corporation, Kyoto (JP)

(72) Inventors: Isao Makuta, Saitama (JP); Koichi Takemura, Shiga (JP); Tomofusa Shibata, Kyoto (JP); Yoshihisa Yamanaka, Shiga (JP); Norikazu Kitamura, Shiga (JP); Masayuki Shinohara, Kyoto (JP); Kazuhide Hirota, Shiga (JP); Yoshikaga Taguchi, Shiga (JP); Masayuki Kojima, Shiga (JP); Yukihiro Takahashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 197 days.

(21) Appl. No.: 13/762,869

(22) Filed: Feb. 8, 2013

(65) Prior Publication Data
US 2014/0125917 A1    May 8, 2014

(30) Foreign Application Priority Data

Nov. 5, 2012  (JP) ................................. 2012-244004
Nov. 22, 2012 (JP) ................................. 2012-256486

(51) Int. Cl.
*G02F 1/1335*    (2006.01)
*F21V 8/00*      (2006.01)
*B32B 38/06*     (2006.01)

(52) U.S. Cl.
CPC .............. *G02B 6/0011* (2013.01); *B32B 38/06* (2013.01); *G02B 6/0065* (2013.01);

(Continued)

(58) Field of Classification Search
CPC ............ G02B 6/0011; G02F 1/133524; B32B 2457/202
USPC .............. 349/62, 65; 362/615, 617, 606, 611, 362/607, 608, 619; 425/508; 264/1.25
See application file for complete search history.

(56) References Cited

U.S. PATENT DOCUMENTS 7,359,012 B2 * 4/2008 Ishiwa et al. .................... 349/65
2008/0043171 A1 * 2/2008 Takahashi et al. .............. 349/65

(Continued)

FOREIGN PATENT DOCUMENTS

JP    2004-074770    * 3/2004    .............. B29C 43/36
JP    2005-310286    * 11/2005    ............... G11B 7/26

(Continued)

OTHER PUBLICATIONS

Notification of Preliminary Rejection issued in Korean Application No. 10-2013-0014347, mailed on Jan. 20, 2014 (18 pages).

(Continued)

*Primary Examiner* — Sang V Nguyen
(74) *Attorney, Agent, or Firm* — Osha Liang LLP

(57) ABSTRACT

A method for producing a light guide plate includes forming a light introduction part that introduces light incident through an end face, and forming a light guide plate body that has a thickness less than a maximum thickness of the light introduction part, forming the light guide plate body to be continuously joined to the light introduction part, and forming the light guide plate body so as to cause a light controller to output the incident light to an outside. The light guide plate producing method further includes a conveying step of conveying a resin sheet between a first die and a second die, which are disposed while facing each other, wherein a transfer surface is provided in at least one of surfaces facing each other in the first and second dies.

18 Claims, 15 Drawing Sheets

(52) U.S. Cl.
CPC ........ *B32B 2309/02* (2013.01); *B32B 2309/12* (2013.01); *B32B 2457/202* (2013.01); *G02B 6/0028* (2013.01); *G02B 6/0038* (2013.01); *G02B 6/0046* (2013.01)

(56) References Cited

U.S. PATENT DOCUMENTS

| | | | |
|---|---|---|---|
| 2010/0195019 A1* | 8/2010 | Shinohara et al. | 349/62 |
| 2010/0315833 A1* | 12/2010 | Holman et al. | 362/607 |
| 2011/0013168 A1* | 1/2011 | Park et al. | 355/71 |
| 2011/0058121 A1* | 3/2011 | Yabe | 349/62 |
| 2011/0205759 A1* | 8/2011 | Kurata et al. | 362/611 |
| 2012/0002441 A1* | 1/2012 | Yabe et al. | 362/607 |
| 2012/0268687 A1* | 10/2012 | Kaida | 349/61 |
| 2013/0033898 A1* | 2/2013 | Kunimochi | 362/611 |

FOREIGN PATENT DOCUMENTS

| | | | |
|---|---|---|---|
| JP | 2005-310286 A | 11/2005 | |
| JP | 2011-048290 | * 3/2011 | .......... G02F 1/13357 |
| JP | 2011-048290 A | 3/2011 | |
| KR | 2004-0002519 A | 1/2004 | |

OTHER PUBLICATIONS

Office Action for Japanese Application No. 2012-256486 dated Jan. 10, 2011, with English translation thereof (7 pages).

Patent Abstract for Japanese Publication No. 2011-048290 published Mar. 10, 2011 (1 page).

Patent Abstract for Japanese Publication No. 2005-310286 published Nov. 4, 2005 (1 page).

* cited by examiner

FIG. 11AA
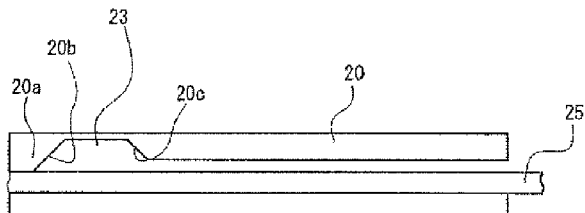
FIG. 11AB
FIG. 11AC
FIG. 11AD
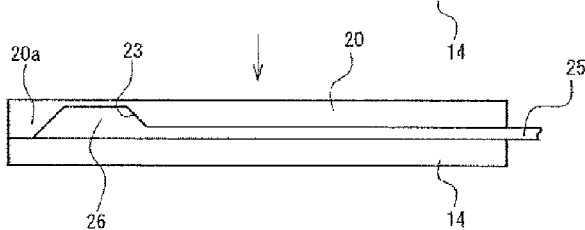
FIG. 11BA
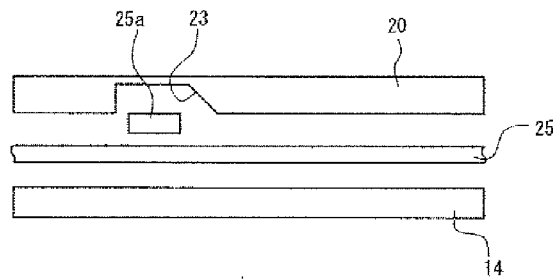
FIG. 11BB
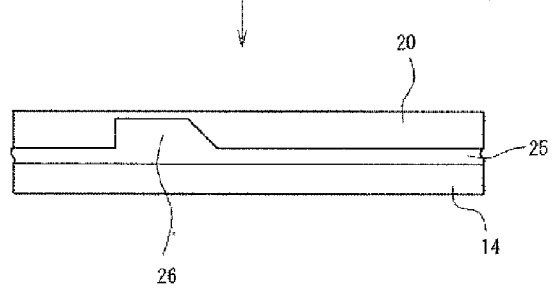

LIGHT GUIDE PLATE PRODUCING METHOD, DIE STRUCTURE, TRANSFER MOLDING APPARATUS, LIGHT GUIDE PLATE, AREA LIGHT SOURCE DEVICE, LIQUID CRYSTAL DISPLAY DEVICE, AND MOBILE DEVICE

CROSS-REFERENCE TO RELATED APPLICATION

The present application claims priority from Japanese Patent Application No. 2012-256486, filed on Nov. 22, 2012, and Japanese Patent Application No. 2012-244004, filed on Nov. 5, 2012, the subject matter of which is hereby incorporated by reference.

BACKGROUND

1. Technical Field

The present invention relates to a light guide plate producing method, a die structure, a transfer molding apparatus, a light guide plate, an area light source device, a liquid crystal display device, and a mobile device.

2. Related Art

Conventionally, there is well known a transfer molding apparatus that heats and pressurizes a resin film with a transfer plate to perform transfer molding of a fine irregular pattern (for example, see Japanese Unexamined Patent Publication No. 2005-310286).

However, in the conventional transfer molding apparatus, for example, only a fine irregular pattern of a sub-micrometer scale can be formed on a surface of the resin film, but a sub-millimeter-scale structure cannot simultaneously be formed.

SUMMARY

One or more embodiments of the present invention is not only be able to transfer a transfer surface to the resin sheet, but also form a thick portion in which a projection is greater than a maximum height of irregularity of the transfer surface.

In accordance with one or more embodiments of the present invention, a method for producing a light guide plate including: a light introduction part that introduces light incident through an end face; and a light guide plate body that has a thickness less than a maximum thickness of the light introduction part, the light guide plate body being provided so as to be continuously joined to the light introduction part, the light guide plate body causing a light controller to output the incident light to an outside, the light guide plate producing method includes: a conveying step of conveying a resin sheet between a first die and a second die, which are disposed while facing each other, a transfer surface being provided in at least one of surfaces facing each other in the first and second dies; a nipping step of nipping the resin sheet between the first and second dies while the transfer surface is abutted on at least one of surfaces of the resin sheet; and a transfer molding step of transferring the transfer surface to at least one of the surfaces of the resin sheet by heating at least one of the first and second dies, and of forming a thick portion in one of the surfaces of the resin sheet by a recess where the light introduction part formed in the die is formed, a projection size of the thick portion being greater than a maximum height of an irregularity where the light controller formed in a surface of the transfer surface is formed.

In a light guide plate producing method according to one or more embodiments of the present invention, the first and second dies are further brought close to each other in the transfer molding process such that a thickness of the light guide plate body of the post-transfer-molding resin sheet is less than an initial thickness of the post-transfer-molding resin sheet.

In a light guide plate producing method according to one or more embodiments of the present invention, the projection size of the light introduction part of the post-transfer-molding resin sheet is greater than or equal to ten times the maximum projection size of the light controller in the transfer molding step.

In a light guide plate producing method according to one or more embodiments of the present invention, the resin sheet is heated to a glass transition temperature or more in the transfer molding step.

In a light guide plate producing method according to one or more embodiments of the present invention, the light introduction part is formed by melting and introducing the resin sheet to the recess formed in the transfer surface in the transfer molding step.

In a light guide plate producing method according to one or more embodiments of the present invention, the resin introduced to the recess of the transfer surface is a surface portion of the molten resin sheet.

In a light guide plate producing method according to one or more embodiments of the present invention, the resin introduced to the recess of the transfer surface is obtained from a region adjacent to a region that constitutes a product after the transfer molding of the resin sheet.

In a light guide plate producing method according to one or more embodiments of the present invention, an additional member is disposed in the recess, and melted together with at least part of the resin sheet to form the light introduction part in the transfer molding step.

In a light guide plate producing method according to one or more embodiments of the present invention, the resin sheet includes a projection in at least part thereof, and the light introduction part is formed by melting at least the projection in the transfer molding step.

In accordance with one or more embodiments of the present invention, there is provided a die structure that is used to mold a light guide plate, the light guide plate including: a light introduction part that introduces light incident through an end face; and a light guide plate body in which a thickness is less than a maximum thickness of the light introduction part, the light guide plate body being provided so as to be continuously joined to the light introduction part, the light guide plate body outputting the incident light to an outside with a light controller, the die structure includes: a first die; a second die that can relatively be separated from and come into contact with the first die; a heater that is provided in at least one of the first and second dies; and a transfer member that is provided in at least one of the first and second dies, the transfer member performing transfer molding while abutting a transfer surface on a resin sheet supplied between the first and second dies, wherein a recess where the light introduction part is formed on a side of at least one of the transfer surfaces and an irregularity where the light controller is formed are formed in the transfer member.

In a die structure according to one or more embodiments of the present invention, a depth of the recess is greater than or equal to ten times of a maximum height of the irregularity formed in the transfer surface.

In a die structure according to one or more embodiments of the present invention, the first and second dies can be brought close to each other such that a thickness of the post-transfer-molding resin sheet is less than an initial thickness of the resin sheet.

In a die structure according to one or more embodiments of the present invention, the heating part can heat the resin sheet to a glass transition temperature or more.

In a die structure according to one or more embodiments of the present invention, the heating part can partially heat the recess such that a temperature at the recess is higher than that at other portions.

In accordance with one or more embodiments of the present invention, a transfer molding apparatus includes the die structure in accordance with one or more embodiments of the present invention.

In accordance with one or more embodiments of the present invention, a light guide plate is formed by the method in accordance with one or more embodiments of the present invention.

In accordance with one or more embodiments of the present invention, an area light source device includes: the light guide plate in accordance with one or more embodiments of the present invention; and a light source that is disposed in at least one of end faces of the light guide plate.

In accordance with one or more embodiments of the present invention, a liquid crystal display device includes: the area light source device in accordance with one or more embodiments of the present invention; and a liquid crystal panel.

In accordance with one or more embodiments of the present invention, a mobile device includes the liquid crystal display device in accordance with one or more embodiments of the present invention.

According to one or more embodiments of the present invention, the transfer surface can be transferred to the resin sheet, but also the thick portion having the large projection in which the scale is different from that of the surface roughness of the transfer surface can simultaneously be formed by the recess formed in the dies.

BRIEF DESCRIPTION OF THE DRAWINGS

FIGS. 11AA-11AD are schematic explanatory views illustrating a method according to other embodiments for forming a thick portion from the resin sheet;

FIGS. 11BA and 11BB are schematic explanatory views illustrating a method according to other embodiments for forming the thick portion from the resin sheet;

DETAILED DESCRIPTION

Figure 1:
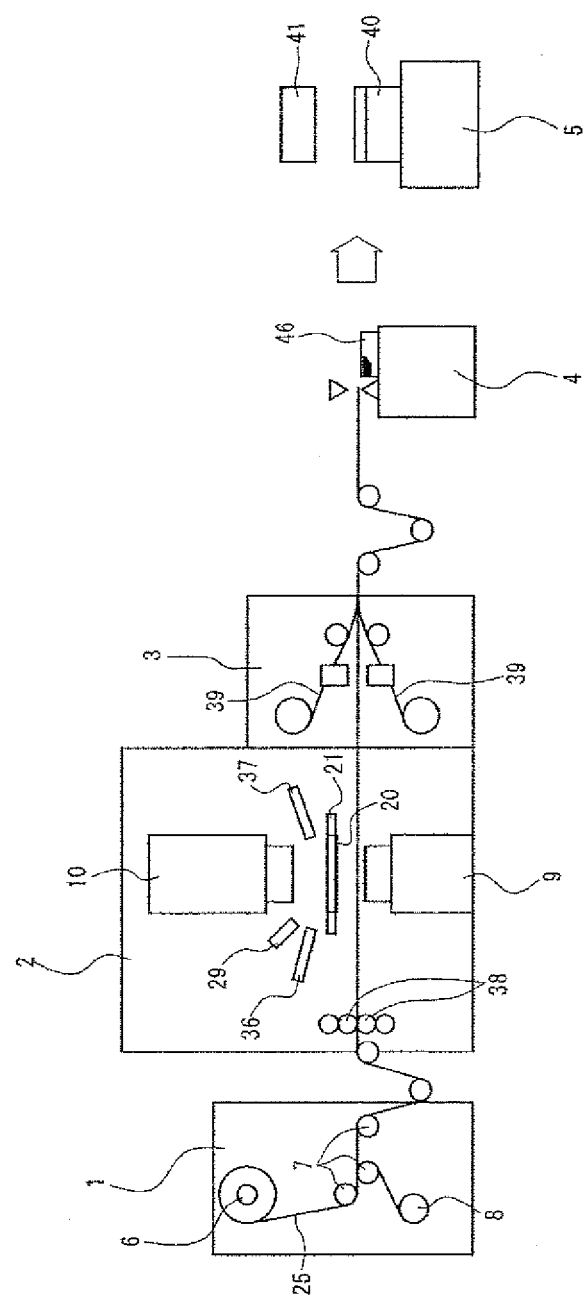
FIG. 1 is a schematic front view illustrating a light guide plate forming apparatus according to a first embodiment.

Hereinafter, embodiments of the present invention will be described with reference to the accompanying drawings. In the following description, a term indicating a specific direction or position (for example, a term including "upper", "lower", "side", and "end") is used. The term is used in the drawings only for the purpose of easy understanding of the present invention, but the technical scope of the present invention is not limited to the term. The following description is made only by way of example, but the present invention and application of the present invention are not limited to the following description. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Configuration

FIG. 1 illustrates a light guide plate forming apparatus according to a first embodiment. The light guide plate forming apparatus includes a material supply apparatus 1, a transfer molding apparatus 2, a film adhesion apparatus 3, a cutting apparatus 4, and an outer shape machining apparatus 5.

The material supply apparatus 1 rewinds a resin sheet 25 wound around a main roller 6, and supplies the resin sheet 25 to the transfer molding apparatus 2. Plural rollers 7 are disposed in the material supply apparatus 1, a protective sheet adhering to the resin sheet 25 is peeled off immediately after the second roller 7, and the protective sheet is wound by a winding roller 8. At this point, the resin sheet 25 is made of polycarbonate (a melting point of about 240° C. and a glass-transition temperature of about 150° C.).

Figure 2:
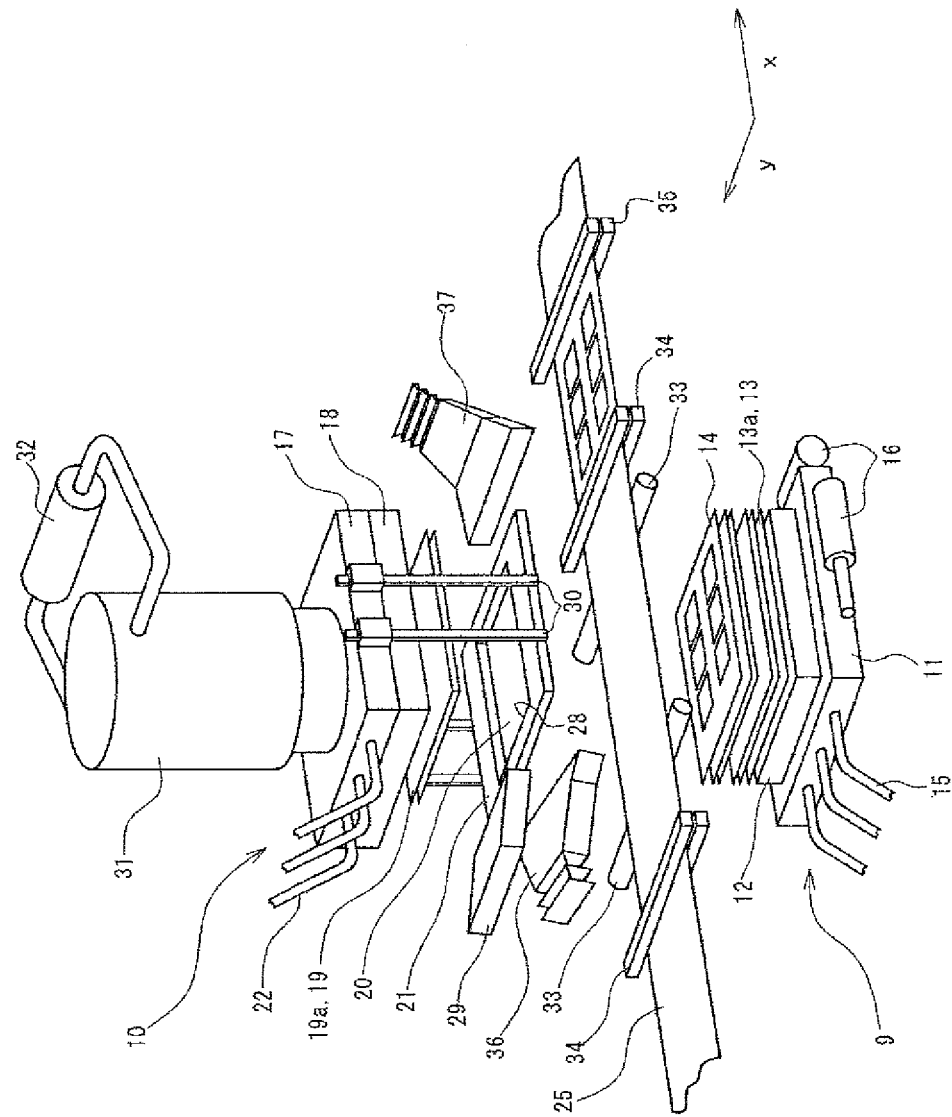
FIG. 2 is a partially exploded perspective view schematically illustrating a transfer molding apparatus in FIG. 1.

As illustrated in FIG. 2, the transfer molding apparatus 2 includes a lower die 9 and an upper die 10.

In the lower die 9, a lower-die intermediate plate 12, a lower-die heat-insulating plate 13, and a lower-die transfer plate 14 are disposed in this order on an upper surface of a lower-die support plate 11.

The lower-die support plate 11 made of stainless steel (SUS) is formed into a rectangular plate shape when viewed from above. Plural through-holes are made between side surfaces of the lower-die support plate 11, and heaters 15 and thermocouples (not illustrated) are inserted in the through-holes. The lower-die support plate 11 is heated by energizing the heaters 15, and a temperature at the lower-die transfer plate 14 can be raised through the lower-die intermediate plate 12 and the lower-die heat-insulating plate 13. At this point, the temperature at the lower-die support plate 11, which is heated by energizing the heaters 15, is suppressed to about 180° C.

Like the lower-die support plate 11, the lower-die intermediate plate 12 made of stainless steel (SUS) is formed into the rectangular plate shape when viewed from above.

The lower-die heat-insulating plate 13 is constructed by stacking plural heat-insulating sheets 13a made of resin materials, such as polyimide (in FIG. 2, the lower-die heat-insulating plate 13 is illustrated while vertically taken apart). Heat-insulating performance can be adjusted according to the number of stacked heat-insulating sheets 13a. At this point, the lower-die heat-insulating plate 13 is constructed by the five heat-insulating sheets, whereby the lower-die transfer plate 14 is adjusted at the temperature of about 150° C. while the lower-die support plate 11 is heated to the temperature of about 180° C. This prevents a deformation of the resin sheet 25, which is caused by a thermal influence of the lower-die support plate 11. Accordingly, a conveying line for the resin sheet 25 is disposed near the lower die 9, but it is not necessary to increase a distance in opening the dies, which allows downsizing of the transfer molding apparatus 2. In closing the dies to heat the resin sheet 25, the lower-die heat-insulating plate 13 plays a role in preventing a heat loss from the upper die 10 onto the lower die side. In cooling the resin sheet 25, the lower-die heat-insulating plate 13 plays a role in preventing the lower-die support plate 11 from being cooled.

The lower-die transfer plate 14 made of a nickel chrome alloy is formed into the rectangular plate shape when viewed from above. A transfer surface is formed on an upper surface of the lower-die transfer plate 14. In the transfer surface, plural hemispherical recesses having sub-micrometer-scale depths are disposed at arbitrary intervals in an x-axis direction and a y-axis direction. Therefore, the plural hemispherical protrusions can be formed on a lower surface of the resin sheet 25 that is of a transfer destination. A surface in which the protrusions are formed constitutes a reflecting surface. The surface functions to reflect light emitted from a light source onto the upper surface side and to output the light through the upper surface. The recess is not limited to the hemispherical shape, but various recessed shapes, such as a conical shape, may be used as the recess. Not the recess, but a projection may be formed.

A horizontal surface of the lower die 9 can be moved in the x-axis direction and the y-axis direction by driving parts (not illustrated), such as a servo motor. A movement amount of the lower die 9 is detected by a micrometer 16, and a position in the horizontal surface of the lower die 9 can finely be adjusted in the x-axis direction and the y-axis direction based on the detection result. The lower die 9 may manually be moved.

In the upper die 10, an upper-die intermediate plate 18, an upper-die heat-insulating plate 19, and a retention plate 21 that retains an upper-die transfer plate 20 are disposed in this order on a lower surface of an upper-die support plate 17.

Like the lower-die support plate 11, the upper-die support plate 17 made of stainless steel (SUS) is formed into the rectangular plate shape when viewed from above. Plural through-holes are made between the side surfaces of the upper-die support plate 17, and heaters 22 and thermocouples (not illustrated) are inserted in the through-holes. The upper-die support plate 17 can be raised up to the temperature of about 280° C. by energizing the heaters 22.

Like the upper-die support plate 17, the upper-die intermediate plate 18 made of stainless steel (SUS) is formed into the rectangular plate shape when viewed from above.

Like the lower-die heat-insulating plate 13, the upper-die heat-insulating plate 19 is constructed by stacking plural heat-insulating sheets 19a made of resin materials, such as polyimide. At this point, the upper-die heat-insulating plate 19 is constructed by the two heat-insulating sheets, whereby the upper-die transfer plate 20 is adjusted to the temperature of about 240° C. Therefore, the resin sheet 25 can sufficiently be melted when the resin sheet 25 is sandwiched between the upper die 10 and the lower die 9.

Figure 3A:
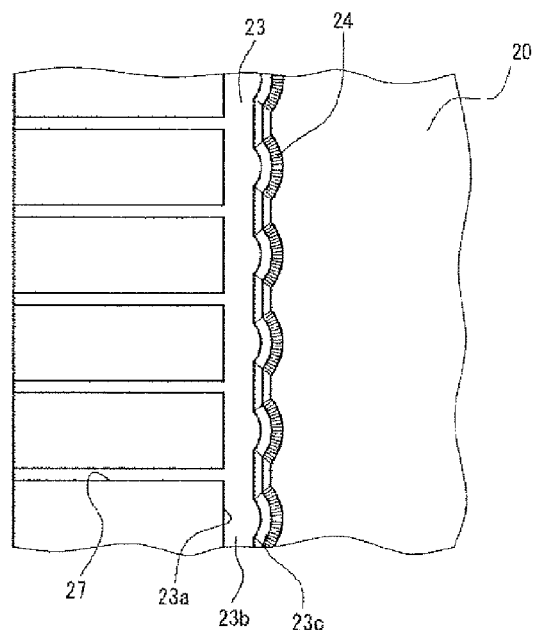
FIG. 3A is a partial plan view of an upper-die transfer plate in FIG. 2.
Figure 3B:
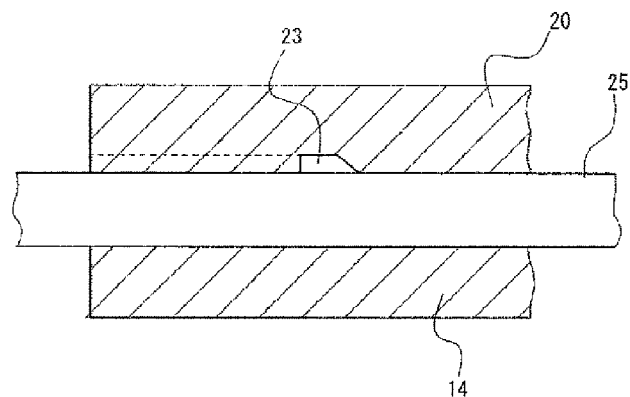
FIG. 3B is a partially schematic sectional view of a die portion in FIG. 2.
Figure 3C:
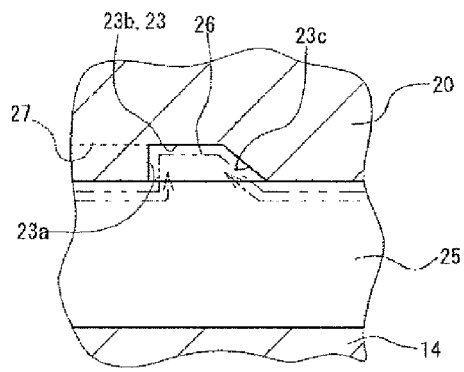
FIG. 3C is a partially enlarged view of the die portion in FIG. 2.

Like the lower-die transfer plate 14, the upper-die transfer plate 20 made of a nickel chrome alloy is formed into the rectangular plate shape when viewed from above. As illustrated in FIGS. 3A-3C, a recess 23 extended in a width direction is formed in the lower surface of the upper-die transfer plate 20. As illustrated in FIG. 3C, the recess 23 is a space surrounded by a perpendicular surface 23a, a bottom surface 23b, an inclined surface 23c, and both end faces (not illustrated). Plural arc regions 24 are arrayed in the width direction in the inclined surface 23c. In each arc region 24, plural projected thread portions (not illustrated), each of which is radially extended and has a substantially triangular shape in section, are arrayed in a circumferential direction.

The recess 23 is configured such that the molten resin sheet 25 flows partially into the recess 23 to form a thick portion 26. The resin sheet 25 includes an extremely thin film, films having thicknesses of 0.2 to 0.3 mm used in the first embodiment, and films having thickness greater than the thicknesses of 0.2 to 0.3 mm. The thick portion 26 has a sub-millimeter-scale height. In the first embodiment, the thick portion 26 has the height of 0.2 mm. The projected thread portion formed in the inclined surface has a projection (surface roughness) of a sub-micrometer scale. In the first embodiment, the projected thread portion has the projection of 0.2 μm. A region where the projected thread portions are formed is the transfer surface, and the region suppresses the light leaking from the inclined surface 23c by folding the light incident from the plural light sources disposed on the end face side of the thick portion 26

Plural groove portions 27 that provides communication between the recess 23 and the side surface are formed in the lower surface of the upper-die transfer plate 20. According to one or more embodiments of the present invention, each groove portion 27 is formed in the direction (the x-axis direction) orthogonal to the width direction (the y-axis direction) in which the recess 23 is extended. Therefore, the groove portion 27 can be shortened to the minimum. Each groove portion 27 is also formed so as to be located between the arc regions 24 and 24. This is because a flow rate of the molten resin becomes the slowest in the region between the arc regions 24 to easily leave a bubble. Therefore, the bubble can effectively be exhausted from the recess 23. The groove portion 27 may have a depth greater than or equal to that of the recess 23. In the first embodiment, the depth of each groove portion 27 is identical to that of the recess 23. The width of the groove portion 27 is set to a value such that the bubble does not remain in the recess 23 while an outflow amount of molten-state resin (resin sheet 25) flowing into the recess 23 is suppressed to the minimum.

Thus, the groove portion 27 that provides communication between the recess 23 and the outside is formed between the arc regions 24 and 24, which allows the air in the recess 23 to be smoothly guided to the outside when the molten resin flows into the recess 23. Part of the resin flowing into the recess 23 also flows to the groove portion 27. Because the groove portion 27 has the depth greater than or equal to that of the recess 23, the air does not remain in the region from the recess 23 to the groove portion 27 (when the groove portion 27 is less than the recess 23 in the depth, a corner portion is formed, and the air possibly remains in the corner portion). Accordingly: the air does not remain in the recess 23 and a void is not generated in the thick portion 26. A burn is not generated in the resin, because an insignificant amount of air remains in the recess 23 even if the air remains. Additionally, the air can be melted in the molten resin by an applied pressure force without generating the void.

As illustrated in FIG. 2, the retention plate 21 made of stainless steel (SUS) is formed into the rectangular frame shape, and an opening 28 is formed in the center of the retention plate 21. The upper-die transfer plate 20 is retained in the lower surface of the retention plate 21, and exposed upward from the opening 28. The upper surface of the upper-die transfer plate 20, which is exposed from the opening 28, is irradiated with a soft X-ray using a soft X-ray irradiation apparatus 29. Therefore, electricity of the resin sheet 25 is removed, and surrounding dust is prevented from adhering to the resin sheet 25 due to an electrostatic attraction force. Rods 30 are coupled to both side portions of the retention plate 21, and the retention plate 21 can be lifted and lowered independently of the whole upper die 10 using driving parts (not illustrated), such as a cylinder.

The whole upper die 10 is lifted and lowered by a press machine 31 disposed on the upper surface side of the upper-die support plate 17. An air supply apparatus 32 supplies and exhausts the air to and from the press machine 31, and the rods 30 (not illustrated) are lifted and lowered to lift and lower the whole upper die 10 with the upper-die support plate 17 interposed therebetween.

The resin sheet 25 supplied by the material supply apparatus 1 is conveyed between the upper die 10 and the lower die 9. On an entrance side and an exit side of the die in the middle of the conveying route of the resin sheet 25, a support roller 33 that supports the lower surface of the resin sheet 25 and a positioning gripper 34 that vertically nips the resin sheet 25 are disposed in the order located closer to the die while being able to be lifted and lowered. A conveying gripper 35 is disposed on a downstream side of the conveying route. Like the positioning gripper 34, the conveying gripper 35 vertically nips the resin sheet 25, and reciprocally moves along the conveying route by a driving part (not illustrated). In the state in which the positioning gripper 34 is opened, the conveying gripper 35 moves onto the downstream side of the conveying route while nipping the resin sheet 25, which allows the resin sheet 25 to be conveyed. Behaviors of the support roller 33 and the grippers are described later.

An air supply duct 36 is disposed on the upper side on the upstream side of the die, and an exhaust air duct 37 is disposed on the upper side on the downstream side of the die. The air supplied by a compressor (not illustrated) blows from the air supply duct 36, and the air blows on the resin sheet 25 located between the upper die 10 and the lower die 9 from obliquely above. The air is sucked from the exhaust air duct 37 by the compressor (not illustrated), and the air blowing on the resin sheet 25 is collected from the air supply duct 36. The air supplied from the air supply duct 36 is purified, an air flow formed from the air supply duct 36 to the exhaust air duct 37 not only cools the resin sheet 25, but also forms what is called an air barrier to prevent the dust from adhering to the surface of the resin sheet 25. Because the electricity of the resin sheet 25 is removed by the irradiation of the soft X-ray, the dust does not adhere to the resin sheet 25 due to the electrostatic attraction force.

As illustrated in FIG. 1, adhesive rollers 38 that come into contact with the upper and lower surfaces of the resin sheet 25 are disposed on the upstream side of the die. When the adhesive rollers 38 are rotated, each of the adhesive rollers 38 removes the dust adhering to the surface of the resin sheet 25 while conveying the resin sheet 25.

The film adhesion apparatus 3 causes protective films 39 to adhere to the upper and lower surfaces of the resin sheet 25 after the transfer molding. The protective film 39 prevents the resin sheet 25 from being damaged due to a collision with another member, or prevents the dust from adhering to the surface of the resin sheet 25.

The cutting apparatus 4 cuts the resin sheet 25, to which the transfer molding is performed, into a reed shape. Four sides of the resin sheet 25 cut by the cutting apparatus 4 are cut by a punching apparatus (not illustrated) to constitute a half-finished plate 46. In the half-finished plate 46, cutting margins are left in the thick portion 26 and the end face on the opposite side of the thick portion 26.

Figure 4A:
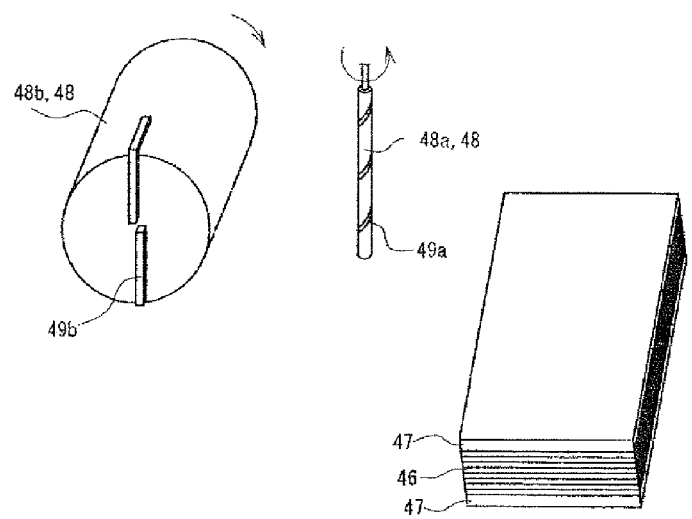
FIG. 4A is an explanatory view illustrating a relationship between a half-finished plate and first and second cutting tools.

The outer shape machining apparatus 5 includes a cutting member 41 that cuts both the end faces (the thick portion 26 and the side surface on the opposite side of the thick portion 26) of the half-finished plate 46. As illustrated in FIG. 4A, the cutting member 41 includes a first cutting tool 48a and a second cutting tool 48b. The cutting tools 48a and 48b are rotated by driving parts (not illustrated). The first cutting tool 48a has a cylindrical shape, and a cutting edge 49a is provided at a position, which is point-symmetric in relation to a rotating axis, in an outer circumferential surface of the first cutting tool 48a for coarse finish. The second cutting tool 48b has a disc shape, notches are formed at two symmetric positions in the outer circumference of the second cutting tool 48b, radially-extended cutting edges 49b are formed in the surface. The second cutting tool 48b is used in mirror finish. A specific cutting method performed by the cutting member 41 is described later.

(Behavior)

A behavior of the light guide plate forming apparatus having the above configuration will be described below.

(Preparation Process)

The upper die 10 is lifted to open the die, and the leading end portion of the resin sheet 25 supplied from the material supply apparatus 1 is nipped by the conveying gripper 35. After the conveying gripper 35 is moved, the resin sheet 25 is nipped by the positioning gripper 34 to dispose the resin sheet 25 in a region where the upper die 10 and the lower die 9 face each other (a conveying process).

The die is previously heated by energizing the heater 15. As described above, because the heat-insulating plate is interposed, the upper-die transfer plate 20 becomes about 240° C. in the upper die 10, and the lower-die transfer plate 14 becomes about 150° C. in the lower die 9. In the lower die 9 located near the resin sheet 25, the temperature of the upper surface of the lower die 9 is suppressed to around a glass-transition temperature, and the resin sheet 25 is bent downward by a thermal influence. Therefore, a trouble such that the resin sheet 25 comes into contact with the lower-die transfer plate 14 is not generated (a preheating process).
(Transfer Molding Process)

The support roller 33 and the positioning gripper 34 are lowered to place the resin sheet 25 on the lower-die transfer plate 14 of the lower die 9. The press machine 31 is driven to lower the upper die 10, and the transfer surface of the upper-die transfer plate 20 is abutted on the resin sheet 25. At this point, a pressure acting on the press machine 31 is suppressed to a low level, and the resin sheet 25 is lightly nipped between the dies. Therefore, the resin sheet 25 is heated to remove a moisture included in a surface layer (a preheating process).

The pressure applied by the press machine 31 is increased when a previously-set time elapses since the preheating process is started. As described above, the resin sheet 25 is made of polycarbonate (the melting point of about 250° C. and the glass-transition temperature of about 150° C.). Because the upper-die transfer plate 20 is heated to 240° C., the temperature of the resin sheet 25 exceeds the melting point, and the resin sheet 25 becomes the molten state. In the lower die 9, although the lower-die transfer plate 14 has the temperature of 180° C., the heat is not lost from the lower die side because the lower-die heat-insulating plate 13 is disposed. Therefore, the whole region of the resin sheet 25 nipped by the dies exceeds the melting point to become the molten state (a heating and pressurization process).

The pressure is applied from the upper die 10 by the press machine 31. Therefore, the resin sheet 25 is thinned in the portion nipped by the dies, and part (an upper surface portion) of the resin sheet 25 flows into the recess 23 formed in the upper-die transfer plate 20. When the molten resin flows into the recess 23, the air in the recess 23 is exhausted to the outside through the groove portion 27. The recess 23 is completely filled with the molten resin, and part of the molten resin flows out to the groove portion 27. The depth of the groove portion 27 is greater than or equal to the depth of the recess 23 (in this case, the same depth). Therefore, the air does not remain in the recess 23, but the air is smoothly exhausted to the outside. Troubles, such as the burn, are not generated because the air is not compressed in the recess 23. Even if a small amount of air remains in the recess 23, because the sufficient pressure is applied to the recess 23, the air can be melted in the molten resin without generating the void.

The upper die 10 is lifted when a previously-set time elapses since the heating and pressurization process is started. However, the upper-die transfer plate 20 remains abutted on the resin sheet 25 by driving the cylinder. At this point, the air is supplied onto the upper-die transfer plate 20 through the air supply duct 36. The heated upper-die support plate 17 is distant from the resin sheet 25, and the air blows onto the upper-die transfer plate 20 from the air supply duct 36. That is, the resin sheet 25 can be cooled only through the upper-die transfer plate 20. The heat of the upper-die support plate 17 does not affect the cooling of the resin sheet 25, so that the resin sheet 25 can effectively be cooled in a short time. That is, the resin sheet 25 can be cooled in a short time to temperatures of 150° C., which is of the glass-transition temperature of polycarbonate, or less. In this case, because the upper-die support plate 17 and the upper-die intermediate plate 18 are not cooled, an energy loss is decreased, and the next transfer molding process can smoothly be started in a short time.

When a previously-set time elapses since the cooling process is started, namely, when the molten resin is solidified to stabilize the shape by the cooling, the upper-die transfer plate 20 is lifted and released from the molded portion. The support roller 33 is lifted to release the molded portion from the lower-die transfer plate 14. Therefore, the thick portion 26 having the sub-millimeter-scale height, namely, the height of 0.2 mm is formed on the upper surface of the resin sheet 25. The plural projected thread portions having the sub-micrometer-scale saw-tooth shapes, namely, the 14-μm saw-tooth shapes are formed on the inclined surface of the thick portion 26. On the other hand, in the lower surface of the resin sheet 25, the plural hemispherical protrusions are formed at constant intervals in the x-axis direction and the y-axis direction (die releasing process).

Conventionally, although the sub-micrometer-scale projection can be formed in the resin sheet 25 by the transfer molding, the sub-millimeter-scale thick portion 26 cannot simultaneously be formed. The use of the transfer molding apparatus 2 having the die structure can simultaneously form the sub-micrometer-scale protrusions and the sub-millimeter-scale thick portion 26 in the resin sheet 25. Because the whole resin sheet 25 nipped between the dies is melted in the transfer molding, the internal stress does not remain in the half-finished plate 46 obtained by the solidification of the melted resin sheet 25. Accordingly, plural LEDs are disposed on the end face side of the thick portion 26, and the whole upper surface except the thick portion 26 can evenly be irradiated with the light after the light is transmitted through the thick portion 26 without deviation.
(Film Adhesion Process)

The resin sheet 25 to which the transfer molding is performed by the transfer molding apparatus 2 is further conveyed onto the downstream side, and the film adhesion apparatus 3 causes the protective films 39 to adhere to the upper and lower surfaces of the resin sheet 25. The protective film 39 prevents the resin sheet 25 from being damaged due to the collision with another member, or prevents the generation of the trouble due to the surrounding dust adhering to the half-finished plate 46. The half-finished plate 46 becomes the light guide plate through the subsequent machining. Then the protective film 39 is peeled off from the resin sheet 25 when the liquid crystal panel is assembled.
(Cutting Process)

The resin sheet 25 in which the protective films 39 adhere to the upper and lower surfaces is further conveyed onto the downstream side, and the cutting apparatus 4 cuts the resin sheet 25 in units of half-finished plates in the conveying direction to form a reed-shaped resin sheet 25. The half-finished plate 46 has the cutting margins for an outer shape machining process in the thick portion 26 and the end face (the cutting surface) on the opposite side of the thick portion 26. At this point, in the cutting surface of the half-finished plate 46, a tapered surface 46a is formed in a corner portion on a cutting direction side of the first cutting tool 48a. The tapered surface 46a has an angle of about 3° with respect to the cutting surface such that the tapered portion is left after the cutting margin is cut.
(Outer Shape Machining Process)

The eight half-finished plates 46 obtained through the cutting process are stacked such that the thick portions 26 are alternately located on the opposite sides. Dummy plates 47 are disposed on the upper and lower surfaces of the stacked half-finished plates 46.

One end face of the stacked half-finished plates 46 and dummy plates 47 is cut using the first cutting tool 48a and the second cutting tool 48b.

As illustrated in FIG. 4A, the first cutting tool 48a is disposed such that the rotating axis of the first cutting tool 48a is parallel to the cutting surface of the half-finished plate 46, and the first cutting tool 48a cuts the end face of the half-finished plate 46 using the cutting edges on the outer circumference while rotated clockwise. In this case, the half-finished plates 46 are stacked and nipped between the dummy plates 47. Accordingly, the half-finished plates 46 can smoothly be cut without generating a flutter during the cutting. In the half-finished plate 46, the tapered surface 46a is formed in the corner portion on the cutting direction side of the first cutting tool 48a. The tapered surface 46a is extended beyond the cutting margin of the cutting surface of the half-finished plate 46. Accordingly, the burr caused by the first cutting tool 48a is not generated in the corner portion of the half-finished plate 46.

Figure 4B:
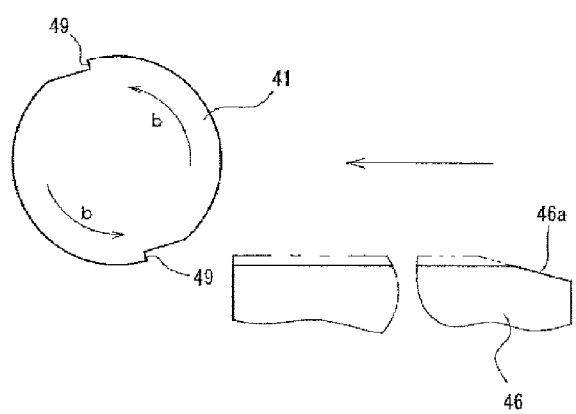
FIGS. 4B and 4C are explanatory views illustrating a relationship between the half-finished plate and the first cutting tool.
Figure 4C:
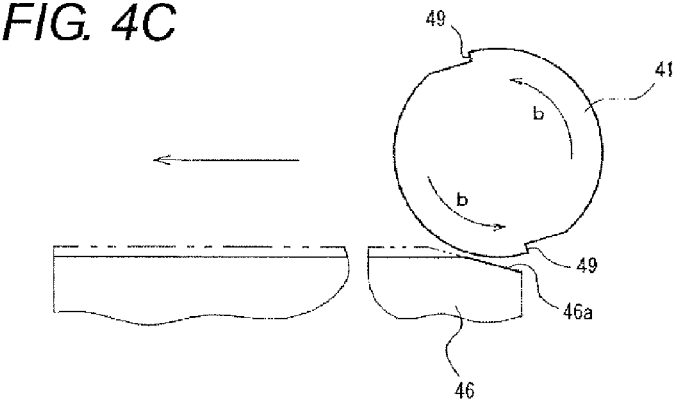

As illustrated in FIG. 4B, the second cutting tool 48b is disposed such that the rotating axis of the second cutting tool 48b is perpendicular to the cutting surface of the half-finished plate 46, and the second cutting tool 48b performs the mirror finish to the cutting surface using the cutting edges on the surface of the second cutting tool 48b. The cutting edges cut the cutting surfaces of the stacked half-finished plates 46 while being rotated. Unless the dummy plates 47 are disposed on the upper and lower surfaces, possibly the burrs are generated at upper and lower edges of the half-finished plates 46 located on both sides. However, the dummy plates 47 are disposed on the upper and lower surfaces. Therefore, even if the burr is generated, the burr is generated in not the half-finished plate 46 but the dummy plate 47.

The completed light guide plate includes a thin portion having the thickness of 0.2 mm and a thick portion having the thickness of 0.5 mm and a thin portion having the thickness of 0.2 mm. Many hemispherical recesses (or protrusions) are formed in the bottom surface of the light guide plate. The light guide plate is assembled in the following manner as one component of the liquid crystal display device together with other components.

Figure 11C:
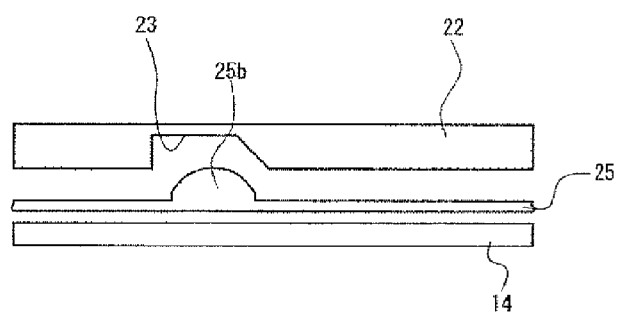
FIGS. 11CA and 11CB is a are schematic explanatory views illustrating a method according to other embodiments for forming the thick portion from the resin sheet.
Figure 11C:
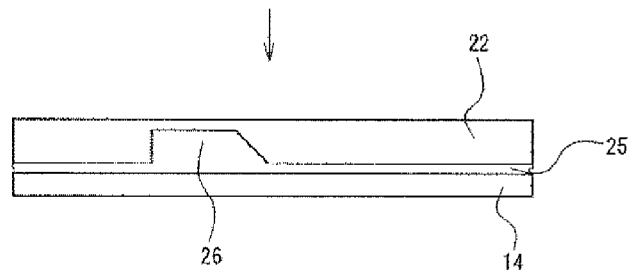
Figure 11D:
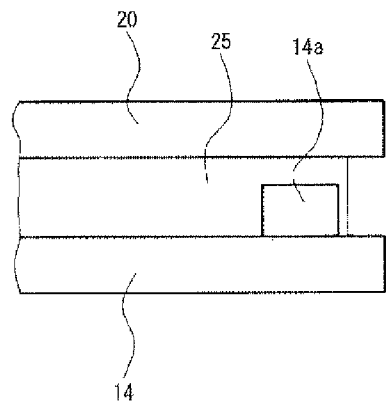
FIGS. 11DA-11DD partially schematic sectional views illustrating a transfer plate and the resin sheet according to other embodiments.
Figure 11D:
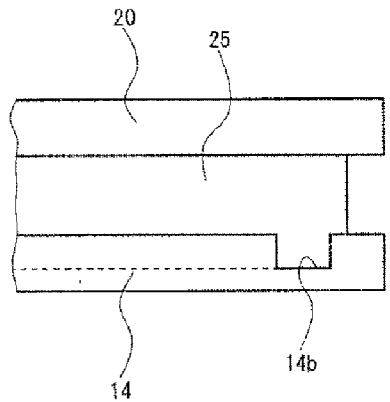
Figure 11D:
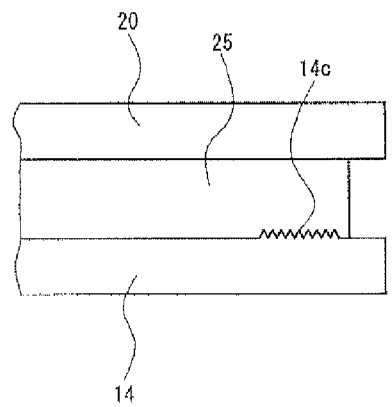
Figure 11D:
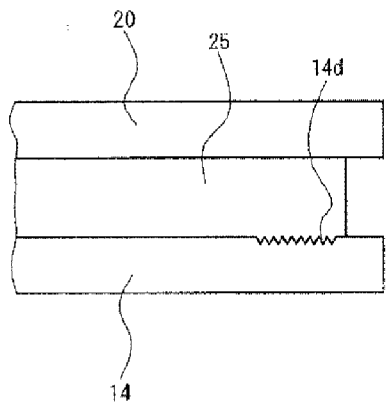
Figure 11E:
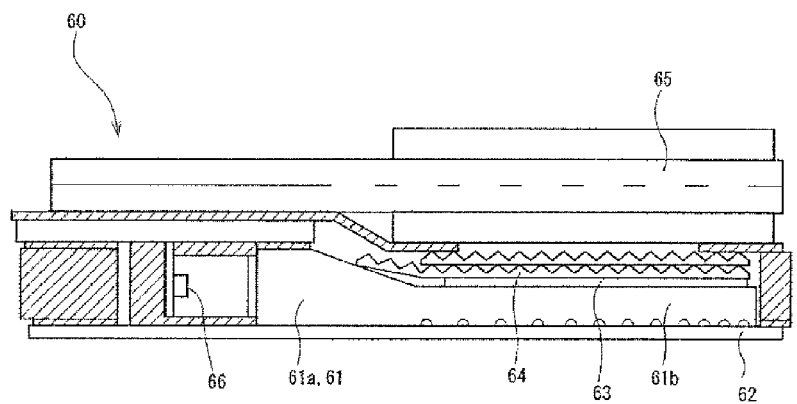
FIG. 11E is a sectional view illustrating a liquid crystal display device in which the light guide plate of the first embodiment is used.

As illustrated in FIG. 11E, a light guide plate 61 is placed on an upper surface of a base 62. A diffuser plate 63, a prism sheet 64, and a liquid crystal panel 65 are sequentially stacked on the upper surface of the light guide plate 61. An LED 66 that is of the light source is disposed in a lateral portion of a perpendicular surface of the thick portion 49a. Therefore, a liquid crystal display device 60 is completed.

In the completed liquid crystal display device 60, the light emitted from the LED 66 is guided to a thin portion 61b while a projected thread portion of a thick portion 61a prevents the light from leaking to the outside. The light is evenly diffused by the hemispherical recesses in the bottom surface, and the liquid crystal panel 65 is irradiated with the light through the diffuser plate 63 and the prism sheet 64.

The light guide plate may solely be used as the area light source device without providing the liquid crystal panel 65.

Figure 5A:
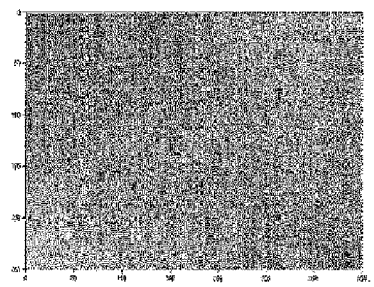
FIG. 5A is a photograph illustrating a lighting state of a light guide plate of the first embodiment.
Figure 5B:
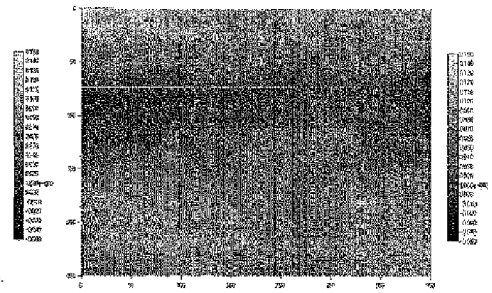
FIG. 5B is a photograph illustrating a lighting state of a conventional light guide plate.
Figure 5C:
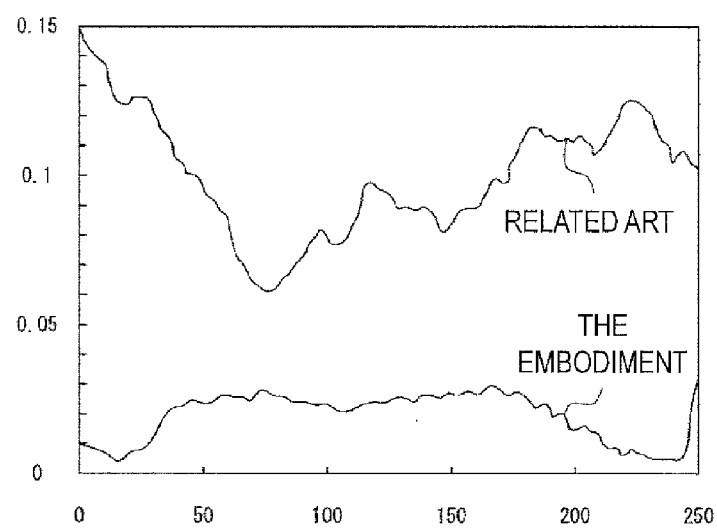
FIG. 5C is a graph illustrating transmitted light amounts of the lighting states in FIGS. 5A and 5B.

A birefringence state of the light guide plate will be described. As described above, the whole resin sheet 25 nipped between the dies is melted in performing the transfer molding. Therefore, an internal stress does not remain in the obtained product, but the structure becomes homogeneous state. Accordingly, as illustrated in FIG. 5A, the light can evenly output from the whole upper surface. On the other hand, for the conventional light guide plate, as illustrated in FIG. 5B, unevenness is generated when the light is output from the whole upper surface. FIG. 5C is a graph illustrating a difference in transmitted light amount between P-polarization and S-polarization with respect to the light guide plates. As is clear from the graph in FIG. 5C, in the light guide plate of the first embodiment, the difference in transmitted light amount can be suppressed to a considerably small level compared with the conventional light guide plate.

Second Embodiment

Figure 6:
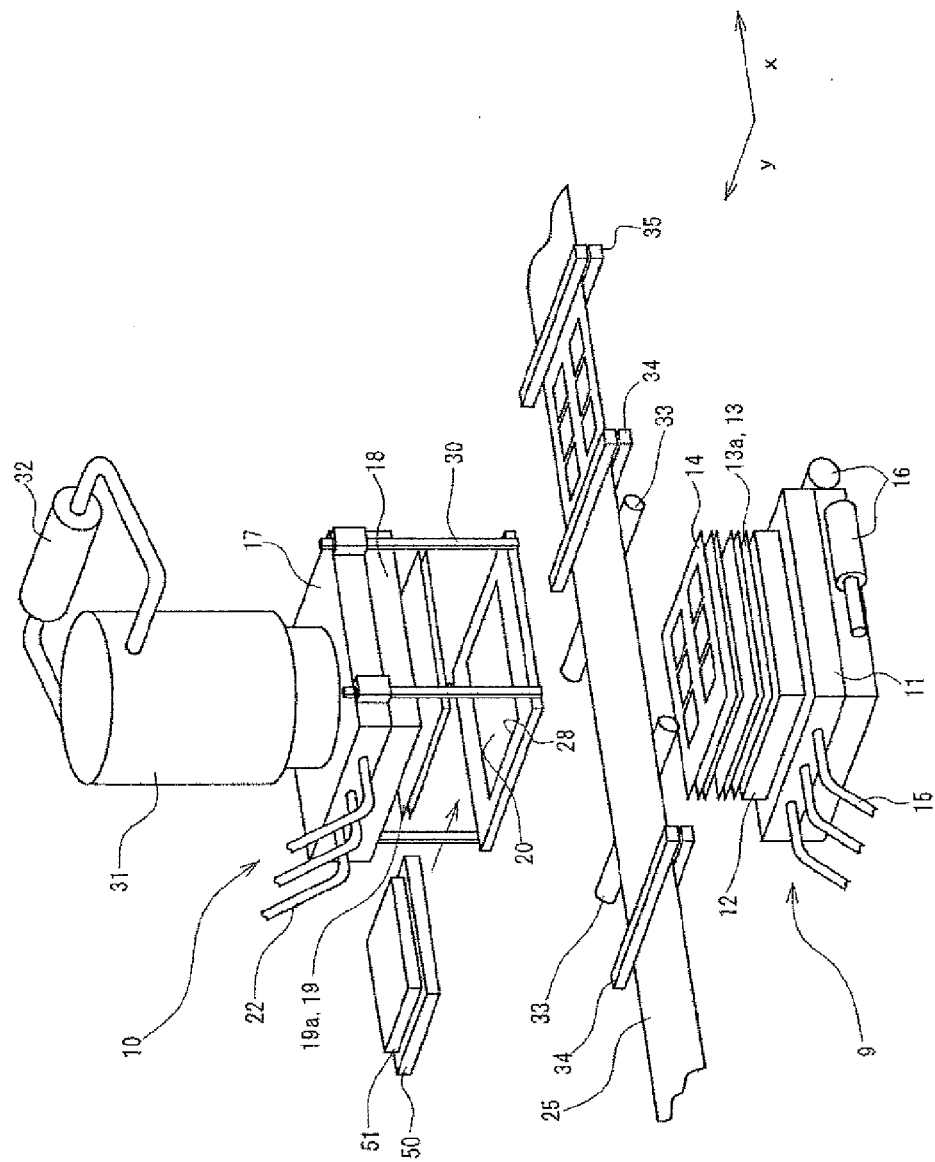
FIG. 6 is a schematic perspective view illustrating a light guide plate forming apparatus according to a second embodiment.

In a transfer molding apparatus according to a second embodiment in FIG. 6, a direct cooling method in which the upper-die transfer plate 20 is cooled by bringing a cooling plate 50 into direct contact with the upper-die transfer plate 20 is adopted instead of the air cooling method in which the upper-die transfer plate 20 is cooled by the air blowing from the air supply duct 36.

The cooling plate 50 can reciprocally be moved between a transfer region in the die and a non-transfer region outside the die by a horizontally moving mechanism (not illustrated). An auxiliary heat-insulating plate 51 is integrally provided on the upper surface of the cooling plate 50. While an upper-side transfer plate is retained in the retention plate 21, the lower surface of the upper-side transfer plate can be abutted on the upper surface of the resin sheet 25, and the lower surface of the cooling plate 50 can be abutted on the upper surface of the upper-side transfer plate. The water-cooled type cooling plate 50 is configured such that a liquid flows through a pipe (not illustrated) to maintain a surface temperature of the cooling plate 50 at a constant value (for example, 20° C.). Because configurations of die and the like of the second embodiment are similar to those of the first embodiment, the corresponding component is designated by the identical numeral, and the description is omitted.

In the configuration of the transfer molding apparatus including the cooling plate 50, after the resin sheet 25 is heated and pressurized, the cooling is performed as follows. In the transfer molding process, when the state illustrated in FIG. 7AA transitions to the cooling process, the upper die 10 is lifted while the upper-die transfer plate 20 is abutted on the resin sheet 25 as illustrated in FIG. 7AB, and the cooling plate 50 is laterally inserted between the upper-die transfer plate 20 and the upper-die intermediate plate 18 as illustrated in FIG. 7AC.

(First Cooling Process)

Figure 7A:
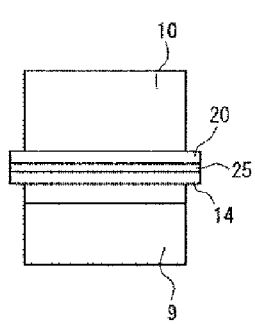
FIGS. 7AA-7AF are explanatory views illustrating a behavior of each plate in a transfer molding apparatus in FIG. 6.
Figure 7A:
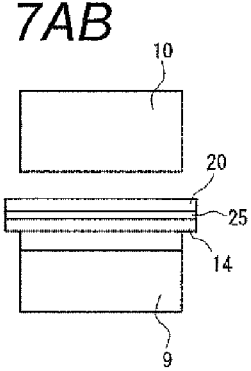
Figure 7A:
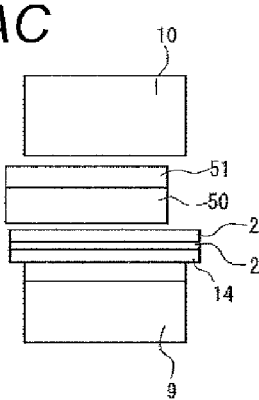
Figure 7A:
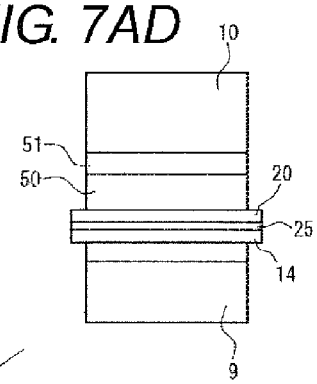
Figure 7A:
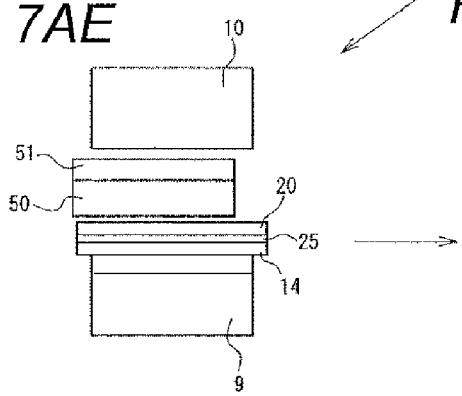
Figure 7A:
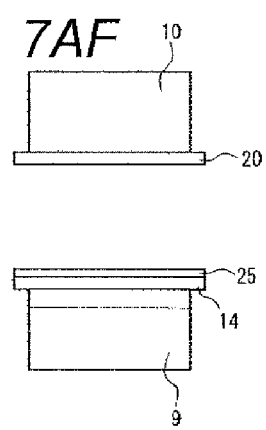
Figure 8:
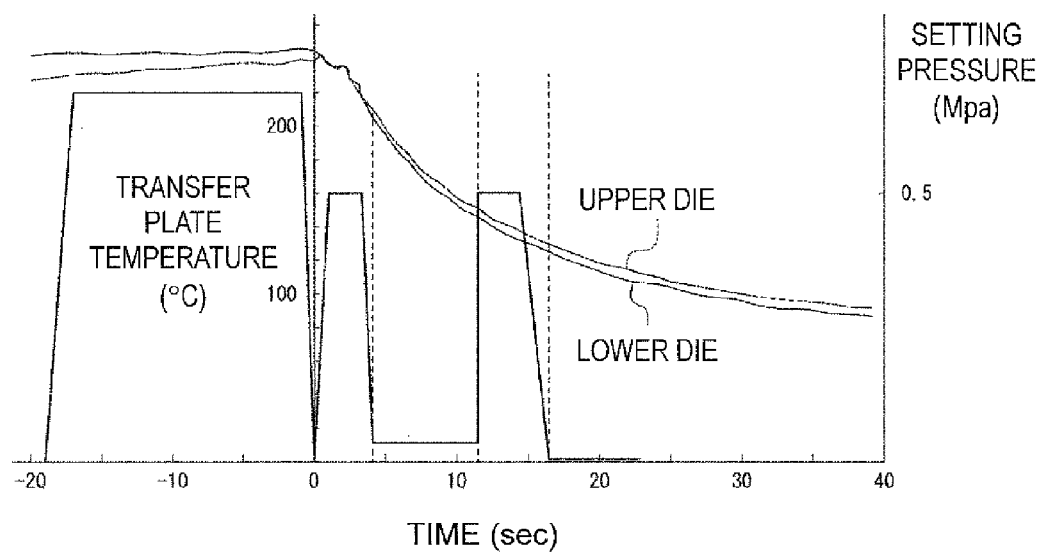
FIG. 8 is a graph illustrating a relationship between a temperature and an applied pressure in a die of the transfer molding apparatus in FIG. 6.

As illustrated in FIG. 7AD, the lower surface of the cooling plate 50 is abutted on the upper surface of the upper-die transfer plate 20, and the cooling plate 50 and the auxiliary heat-insulating plate 51 are nipped between the upper-die transfer plate 20 and the upper-die intermediate plate 18. As illustrated in FIG. 8, at this point, the applied pressure is set to a high level (lower than a level during heating and pressurization) such that the bubble (void) can be eliminated from the resin sheet 25 (for example, the applied pressure is set to 0.8 MPa or more by a Boyle-Charle's law such that the bubble having a diameter of about 0.4 mm can be decreased to a diameter of about 0.1 mm).

(Second Cooling Process)

Figure 7B:
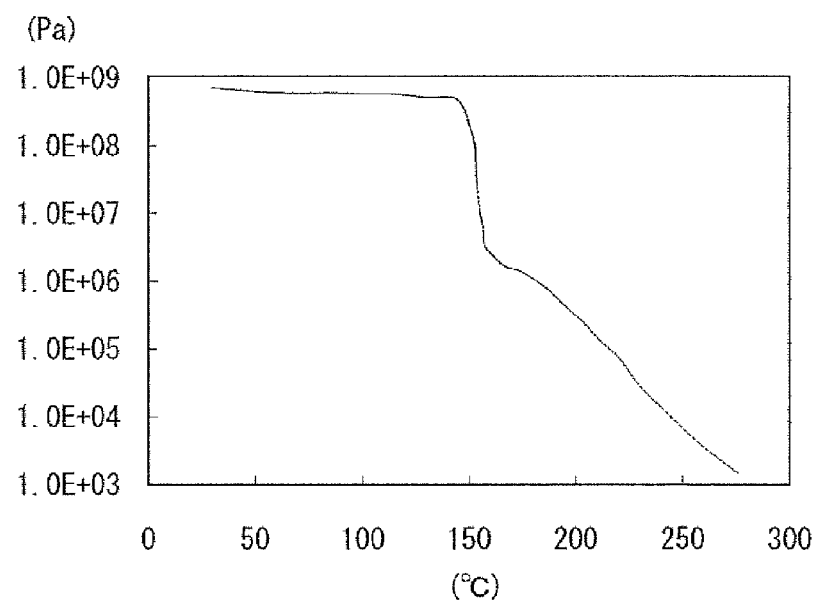
FIG. 7BA is a graph illustrating a change in elastic modulus of a resin sheet according to a temperature change of the resin sheet, and FIG. 7BB is a graph illustrating a change in residual stress according to the temperature change of the resin sheet.
Figure 7B:
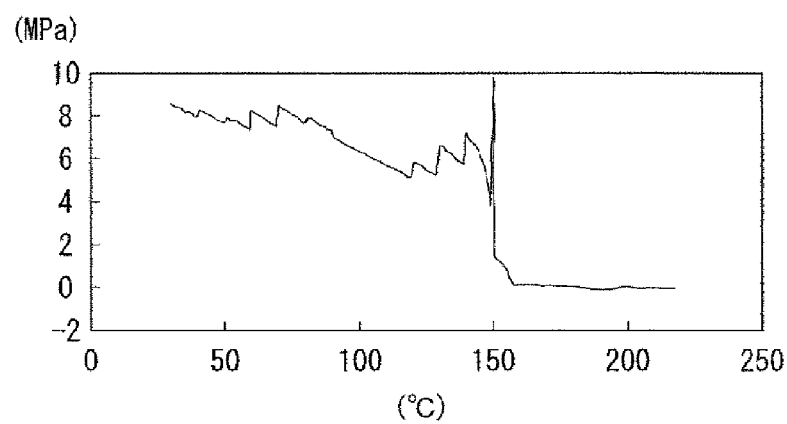

When the temperature at the resin sheet 25 is lowered to the melting point of the resin sheet 25 or less (for example, 200° C.) (at this point, the temperature is managed by a time, at a time point a first setting time elapses since the first cooling process is started), the applied pressure is instantly reduced (for example, the applied pressure is set to 0.1 MPa). As illustrated in FIG. 7BA, an elastic modulus of the resin sheet 25 is increased with decreasing temperature, an elastic deformation of the resin sheet 25 is hardly performed, and the resin sheet 25 is solidified at the glass transition temperature of about 150° C. to lose fluidity. Therefore, as illustrated in FIG. 7BB, in the state in which the pressure is still applied to the resin sheet 25 by the die, a residual stress is generated in the resin sheet 25 when the temperature is lowered to about 150° C. Actually the resin sheet 25 becomes a rubber-like elastic body from about 200° C. and the residual stress is generated. Therefore, in the second embodiment, the residual stress is removed by reducing the applied pressure when the temperature at the resin sheet 25 is lowered to about 200° C.

(Third Cooling Process)

When the temperature at the resin sheet 25 is lowered to the glass transition temperature or less (for example, 150° C.) (at this point, the temperature is managed by a time, at a time point a second setting time elapses since the second cooling process is started), the applied pressure is increased again (for example, the applied pressure is set to 0.5 MPa or more). Because the resin sheet 25 is cooled from the upper surface side, a temperature distribution of the resin sheet 25 varies inevitably. At a time point the upper surface side of the resin sheet 25 is lowered to the glass transition temperature or less and solidified, sometimes the lower surface side of the resin sheet 25 is not lowered to the glass transition temperature. In this case, the solidified upper surface side of the resin sheet 25 does not follow thermal shrinkage on the lower surface side of the resin sheet 25, a central portion of the lower surface rises to generate a warp. However, a shrinkage stress can forcedly be canceled by increasing the applied pressure again.

When the cooling method of the second embodiment is adopted, a cooling time can be shortened compared with the air cooling of the first embodiment. Specifically, compared with the cooling time for 110 seconds in the air cooling of the first embodiment, the cooling time can be shortened to 55 seconds in the direct cooling of the second embodiment. Not only the heat-insulating plate is disposed in each of the upper die 10 and the lower die 9, but also the auxiliary heat-insulating plate 51 is integrally provided on the upper surface of the cooling plate 50. Therefore, even if the cooling plate 50 is maintained at low temperature, an influence of the cooling plate 50 on the upper die 10 can be suppressed to shorten a recovery time to the next heating and pressurization.

When the resin sheet 25 is cooled as described above, the upper die 10 is lifted to horizontally move and retreat the cooling plate 50 as illustrated in FIG. 7AE. As illustrated in FIG. 7AF, the upper-die transfer plate 20 is lifted to end one cycle.

Third Embodiment

As illustrated in FIGS. 9A-9D and 10E-10G, a transfer molding apparatus according to a third embodiment includes a cooling mechanism in which the resin sheet 25 is vertically cooled from not only the upper surface side of the upper-die transfer plate 20 but also the lower surface of the lower-die transfer plate 14.

The transfer molding apparatus of the second embodiment includes the cooling plate 50 in which the auxiliary heat-insulating plate 51 is integrated on the upper surface. On the other hand, the transfer molding apparatus of the third embodiment includes a second cooling plate 54 in which an auxiliary heat-insulating plate 55 is integrated on the lower surface in addition to a first cooling plate 52 corresponding to the auxiliary heat-insulating plate 51 in which an auxiliary heat-insulating plate 53 is integrated on the upper surface. The whole lower die except the lower-die transfer plate 14 can horizontally be moved to a retreat position. The resin sheet 25, in which the upper-die transfer plate 20 is abutted on the upper surface and the lower-die transfer plate 14 is abutted on the lower surface, can be inserted between the first cooling plate 52 and the second cooling plate 54 while the first cooling plate 52 and the second cooling plate 54 vertically face each other.

Action of the transfer molding apparatus 2 including the cooling mechanism having the above configuration will be described below.

Figure 9A:
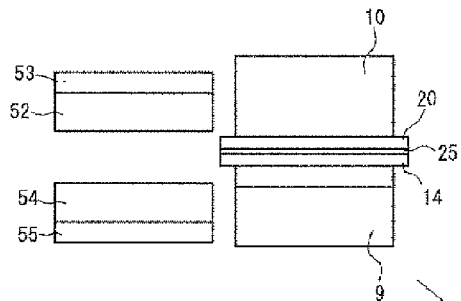
FIGS. 9A-9D are explanatory views illustrating a behavior of each plate in a transfer molding apparatus according to a third embodiment.
Figure 9B:
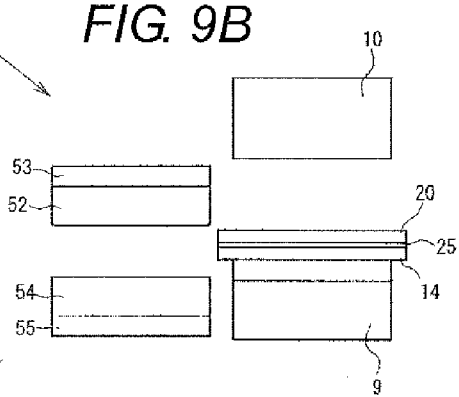
Figure 9C:
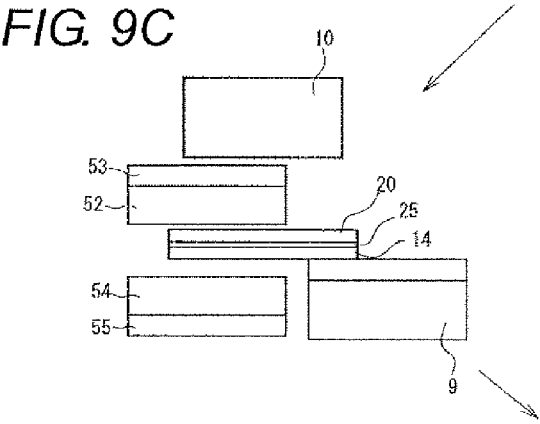
Figure 9D:
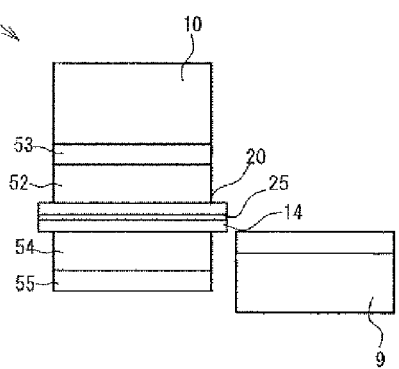

Like the first and second embodiments, when the preheating process and the transfer molding process are ended as illustrated in FIG. 9A, the upper die 10 is lifted while the upper-die transfer plate 20 is abutted on the upper surface of the resin sheet 25 as illustrated in FIG. 9B. As illustrated in FIG. 9C, while the lower-die transfer plate 14 is abutted on the lower surface of the resin sheet 25, other portions of the lower die 9 are horizontally moved to the retreat position. The upper-die transfer plate 20 and the lower-die transfer plate 14, which are vertically disposed while facing each other, are horizontally moved, and the resin sheet 25 in which the upper-die transfer plate 20 and the lower-die transfer plate 14 are abutted on the upper and lower surfaces is disposed between the first cooling plate 52 and the second cooling plate 54. At this point, as illustrated in FIG. 9D, the upper die 10 is lowered, and the resin sheet 25 in which the upper-die transfer plate 20 and the lower-die transfer plate 14 are abutted on the upper and lower surfaces is nipped between the first cooling plate and the second cooling plate. The cooling process of the resin sheet 25 is started by applying the pressure.

In the cooling process, the resin sheet 25 can evenly cooled from in the vertical direction. Accordingly, unlike the second embodiment, it is not necessary to deal with troubles, such as the warp, through the first to third cooling processes. That is, the half-finished plate 46 can be completed with no warp through the single cooling process.

Figure 10E:
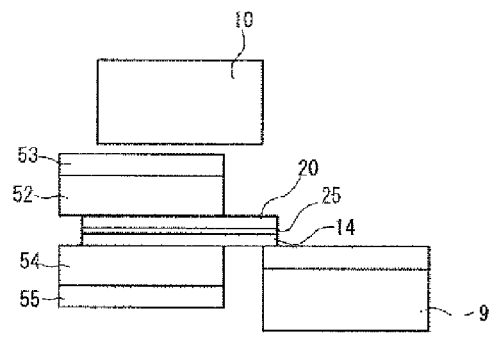
FIGS. 10E-10G are explanatory views illustrating the behavior of each plate in the transfer molding apparatus of the third embodiment.
Figure 10F:
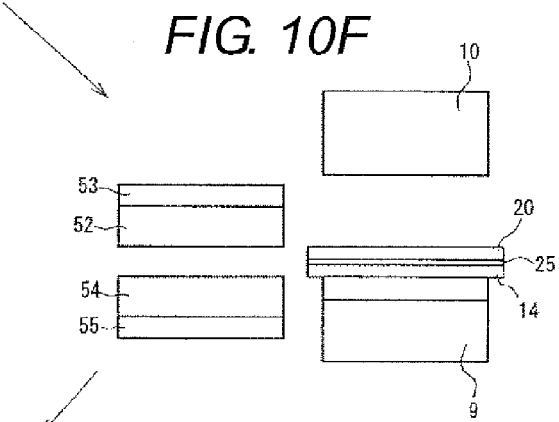
Figure 10G:
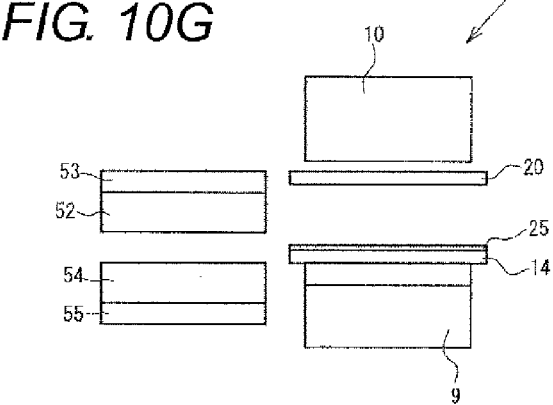

When the cooling process is ended, the first cooling plate 52, the second cooling plate 54, and portions except the lower-die transfer plate 14 of the lower die 9 are horizontally moved to the original position as illustrated in FIG. 10E. When the resin sheet 25 in which the upper-die transfer plate 20 and the lower-die transfer plate 14 are abutted on the upper and lower surfaces is located on the lower die 9 as illustrated in FIG. 10F, the upper-die transfer plate 20 is lifted to end one cycle as illustrated in FIG. 10G.

Additional Embodiments

The present invention is not limited to the embodiments above, but various changes can be made.

For example, in one or more of the above embodiments, the resin sheet 25 is melted and part of the molten resin is caused to flow into the recess 23 formed in the upper-die transfer plate 20, thereby forming the thick portion 26. Alternatively, the thick portion 26 may be formed as follows.

In FIG. 11AA, the molten resin of a nonproductive portion (except a region constituting the light guide plate) in the resin sheet 25 can be caused to flow into the recess 23. That is, a height of a sidewall 20a on the nonproductive portion side constituting the recess 23 formed in the upper-die transfer plate 20 is greater than that of other portions. An inner surface 20b formed by the sidewall 20a is constructed by an inclined surface 20b so as to be gradually opened from the bottom surface side of the recess 23.

Therefore, when the die is brought into contact with the resin sheet 25 to apply the pressure in the transfer molding as illustrated in FIG. 11AB, the molten resin of the nonproductive portion flows into the recess 23 through the inclined surface 20b of the sidewall 20a as illustrated in FIG. 11AC. Then part of the resin on the product portion side flows also into the recess 23 through an inclined surface 20c of a sidewall on the other side. In this case, the sidewall 20a is largely projected, so that an inflow amount of molten resin can sufficiently be increased in the nonproductive portion. Accordingly, a disposed resin amount can be suppressed to achieve cost reduction. As illustrated in FIG. 11AD, the recess 23 is filled with the molten resin. Because the subsequent cooling process is similar to that of one or more of the above embodiments, the description is omitted.

In FIG. 11BA, the resin sheet 25 is not melted and part of the molten resin is not caused to flow into the recess 23, but an additional member (for example, a resin piece 25a) is supplied to the upper-die transfer plate 20 according to the recess 23. Therefore, as illustrated in FIG. 11 BB, the thick portion 26 can easily be formed.

In FIG. 11CA, a projection 25b is previously formed in part of the resin sheet 25, whereby the additional member is previously integrated. According to one or more embodiments of the present invention, the thickness of the projection 25b is less than the thickness of the thick portion 26, and is greater than the thickness of the pre-transfer-molding resin sheet 25. In the configuration in which the projection 25b is provided, a mechanism that supplies the additional member is eliminated to improve workability.

In one or more of the above embodiments, the recess 23 is formed in the upper-die transfer plate 20. Alternatively, the recess may be provided in the lower-die transfer plate 14, or both the upper-die transfer plate 20 and the lower-die transfer plate 14.

The die structure including the upper die 10 and the lower die 9 is used in one or more of the above embodiments. Alternatively, a die that is horizontally opened and closed may be used.

In one or more of the above embodiments, the transfer surfaces are formed in the upper-die transfer plate 20 and the lower-die transfer plate 14. Alternatively, the transfer surface may be formed in one of the upper-die transfer plate 20 and the lower-die transfer plate 14. The transfer plates are eliminated, and the transfer surfaces may directly be formed in the dies (for example, an intermediate plate).

In one or more of the above embodiments, the whole upper-die transfer plate 20 is evenly heated. However, the whole upper-die transfer plate 20 is not necessarily evenly heated. For example, the neighborhood of the recess 23 may intensively be heated. Therefore, the good molten state of the resin can be obtained in the recess 23 to form the good thick portion 26 in which a shrinkage is not generated.

In one or more of the above embodiments, the resin sheet 25 is heated and pressurized while nipped between the upper-die transfer plate 20 and the lower-die transfer plate 14, and the whole resin sheet 25 is melted. Therefore, in at least one of the transfer plates 20 and 14, according to one or more embodiments of the present invention, a flow regulating structure that regulates the flow of the molten resin is provided in a rim portion.

In FIG. 11D, a flow regulating structure is formed in a rim portion of the upper surface of the lower-die transfer plate 14. However, it is not necessary to form the flow regulating structure to surround all the four sides. As long as the molten resin does not flow to the surroundings, the flow regulating structure may discontinuously be provided, or the flow regulating structure may be provided only in both side portions.

In FIG. 11DA, the flow regulating structure is constructed by a projected thread portion 14a that is projected from the upper surface of the lower-die transfer plate 14. In FIG. 11DB, the flow regulating structure is constructed by a groove portion 14b that is formed in the upper surface of the lower-die transfer plate 14. In FIG. 11DC, the flow regulating structure is constructed by many micro projected portions 14c that are projected from the upper surface of the lower-die transfer plate 14. In FIG. 11DD, the flow regulating structure is constructed by many micro recessed portions 14c that are formed in the upper surface of the lower-die transfer plate 14. The configurations in FIGS. 11DA-11DD may be formed in the upper-die transfer plate 20, or both the transfer plates 14 and 20. The flow regulating structure is not limited to the configurations in FIG. 11DA-11DD, but flow regulating structure having any configuration may be used as long as a flow resistance against the molten resin is increased.

In one or more of the above embodiments, the applied pressure in the cooling process is determined as illustrated in FIG. 8. Alternatively, the applied pressure may be determined as follows.

For example, in the first cooling process, an applied pressure $P_1$ is determined by a Boyle-Charlers law (PV/T=constant) in order to compress the bubble having the diameter of 0.4 mm to the diameter of 0.1 mm.

$$P_0 \times V_0 / T_0 = P_1 \times V_1 / T_1 \tag{1}$$

The following values are substituted for the equation (1).
$P_0$=101325 Pa (atmospheric pressure)
$V_0$=3.35×10$^{-11}$ m$^3$ (volume of bubble having diameter of 0.4 mm)
$T_0$=240° C.=513K
$V_1$=5.23×10$^{-13}$ m$^3$ (volume of bubble having diameter of 0.1 mm)
$T_1$=190° C.=463K
Therefore, $P_1$=5.85 MPa is obtained.

Accordingly, the bubble having the diameter of 0.4 mm can be compressed to the diameter of 0.1 mm or less by applying pressures of 5.85 MPa or more.

In the second cooling process, because the temperature at the resin sheet 25 (polycarbonate) is lowered to 190° C., the applied pressure is decreased to 0.02 MPa (the applied pressure may be decreased to 0 MPa). Therefore, the residual stress is removed.

In the third cooling process, the pressure, which corresponds to the shrinkage stress when the resin sheet 25 (polycarbonate) is lowered from the glass transition temperature of 150° C. to the temperature of 130° C. at which the die can be released, is determined as the applied pressure $P_2$.

That is, $P_2$=E×αE (elastic modulus)=2.45 GPa, and α (linear expansion coefficient of polycarbonate)=7×10$^{-5}$. Accordingly, $P_2$=3.4 MPa is obtained. The deformation caused by the shrinkage stress of the resin sheet 25 during the cooling can be prevented when pressures of $P_2$=3.4 MPa or more (for example, 6.2 MPa) are applied.

In one or more of the above embodiments, the preparation process, the transfer molding process, the film adhesion process, and the cutting process are continuously performed by the sequence of parallelly arranged apparatuses. Alternatively, the preparation process, the transfer molding process, the film adhesion process, and the cutting process may separately be performed, or partially continuously be performed. In fact, the preparation process, the transfer molding process, the film adhesion process, and the cutting process may sequentially be performed irrespective of the continuity or discontinuity. The processes in the transfer molding process may separately be performed, or partially continuously be performed.

In one or more of the above embodiments, the maximum height of the irregularity formed in the transfer surface is set to the sub-micrometer scale and the projection of the thick portion 26 is set to the sub-millimeter scale. Alternatively, for example, the maximum height of the irregularity is set to a micrometer scale (for example, 200 μm) and the projection of the thick portion 26 is set to a millimeter scale (for example, 1 mm). In fact, it is only necessary that the projection of the thick portion 26 be greater than the maximum height of the irregularity. According to one or more embodiments of the present invention, the projection of the thick portion 26 is greater than or equal to ten times the maximum height of the irregularity. When the projection of the thick portion 26 is greater than or equal to ten times the maximum height of the irregularity, the projection of the thick portion 26 may be set to the sub-micrometer scale.

The continuous, belt-like resin sheet 25 is used in one or more of the above embodiments. Alternatively, the transfer molding may be performed to one (or at least two) half-finished plate 46 as a discontinuous, reed-shaped configuration. In this case, the reed-shaped resin sheet 25 may be conveyed by vertically disposing rotatable rollers.

In one or more of the above embodiments, the light guide plate is produced by the transfer molding method. Alternatively, various optical members, such as the prism sheet, may be produced.

In one or more of the above embodiments, the light guide plate is used in the liquid crystal display device having the configuration in FIG. 11E. Alternatively, for example, the configuration of the light guide plate may be changed and used in an area light source device in FIG. 11F.

Figure 11F:
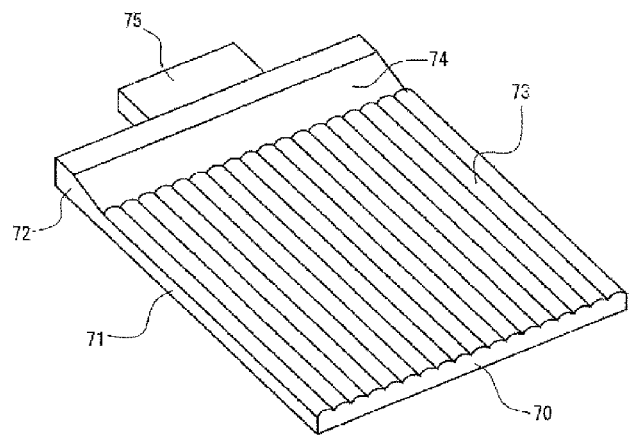
FIG. 11F is a perspective view illustrating an area light source device in which the light guide plate of other embodiments is used.

A light guide plate 70 in FIG. 11F includes a light guide plate body 71 having the substantially even thickness and a wedge-shaped light introduction part 72. A deflection pattern or a diffusion pattern is formed on a rear surface of the light guide plate body 71, and a lenticular lens 73 having a semicircular shape in section is formed on the surface of the light guide plate body 71. In the light introduction part 72, an inclined surface 74 is formed from the light introduction part 72 toward the light guide plate body 71. The thickness of the end face (the light incident surface) of the light introduction part 72 is greater than the height of the light source 75.

In the area light source device 11 in which the light guide plate 70 having the above configuration is used, the thickness of the end face of the light introduction part 72 can be set greater than the height of the light source 75. Accordingly, the light emitted from the light source 75 can efficiently be taken in the light introduction part 72. The light taken in the light introduction part 72 is introduced to the light guide plate body 71, spread in a planar manner, reflected by the deflection pattern or the diffusion pattern, and output to the outside through the light exit surface of the light guide plate body 71. At this point, a directional pattern of the light output through the light exit surface is widened by the lenticular lens 73.

Thus, in the area light source device having the above configuration, a balance between the improvement of the light use efficiency of the light source 75 and the low profile of the area light source device can be established.

In the light guide plate 70, the lenticular lens 73 having the semicircular shape in section is formed on the surface of the light guide plate body 71. Alternatively, the surface of the light guide plate body 71 may have other sectional shapes, such as a prism lens having a triangular shape in section.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for producing a light guide plate, comprising:
    forming a light introduction part that introduces light incident through an end face; and
    forming a light guide plate body that has a thickness less than a maximum thickness of the light introduction part,
    forming the light guide plate body to be continuously joined to the light introduction part,
    forming the light guide plate body to comprise a light controller thereon that outputs the incident light to an outside of the light guide plate,
    wherein the light guide plate producing method further comprises:
        a conveying step of conveying a resin sheet between a first die and a second die, which are disposed while facing each other, wherein a transfer surface is provided in at least one of surfaces facing each other in the first and second dies;
        a nipping step of nipping the resin sheet between the first and second dies while the transfer surface is abutted on at least one of surfaces of the resin sheet; and
        a transfer molding step of transferring the transfer surface to at least one of the surfaces of the resin sheet by heating at least one of the first and second dies, and of forming a thick portion in one of the surfaces of the resin sheet by a recess where the light introduction part formed in the die is formed,
    wherein an amount that the thick portion projects greater than a maximum height of an irregularity that forms the light controller, and
    wherein the light introduction part is formed by melting and introducing the resin sheet to the recess formed in the transfer surface in the transfer molding step, and
    wherein the resin sheet is thinned in the portion nipped by the first and second dies, and part of the resin sheet flows into the recess.

2. The light guide plate producing method according to claim 1, wherein an amount that the light introduction part of the post-transfer-molding resin sheet projects is greater than or equal to ten times a maximum amount that the light controller projects in the transfer molding step.

3. The light guide plate producing method according to claim 1, wherein the resin sheet is heated to a glass transition temperature or more in the transfer molding step.

4. The light guide plate producing method according to claim 1, wherein the resin introduced to the recess of the transfer surface is a surface portion of the molten resin sheet.

5. The light guide plate producing method according to claim 1, wherein an additional member is disposed in the recess, and melted together with at least part of the resin sheet to form the light introduction part in the transfer molding step.

6. The light guide plate producing method according to claim 1, wherein the resin sheet includes a projection in at least part thereof, and wherein the light introduction part is formed by melting at least the projection in the transfer molding step.

7. A die structure that is used to mold a light guide plate, wherein the light guide plate comprises:
    a light introduction part that introduces light incident through an end face; and
    a light guide plate body in which a thickness is less than a maximum thickness of the light introduction part,
    wherein the light guide plate is disposed to be continuously joined to the light introduction part,
    wherein the light guide plate body outputs the incident light to an outside of the light guide plate with a light controller,
    wherein the die structure comprises:
        a first die;
        a second die configured to relatively be separated from and come into contact with the first die;
        a heater that is provided in at least one of the first and second dies; and
        a transfer member that is provided in at least one of the first and second dies, wherein the transfer member is configured to perform transfer molding while abutting a transfer surface on a resin sheet supplied between the first and second dies, and wherein a recess where the light introduction part is formed on a side of at least one of the transfer surfaces and an irregularity that forms the light controller, wherein the light introduction part is formed by melting and introducing the resin sheet to the recess formed in the transfer surface in the transfer molding step, and wherein the resin sheet is thinned in the portion nipped by the first and second dies, and part of the resin sheet flows into the recess.

8. The die structure according to claim 7, wherein a depth of the recess is greater than or equal to ten times of a maximum height of the irregularity formed in the transfer surface.

9. The die structure according to claim 7, wherein the heating part is configured to heat the resin sheet to a glass transition temperature or more.

10. The die structure according to claim 7, wherein the heating part is configured to partially heat the recess such that a temperature at the recess is higher than that at other portions.

11. A transfer molding apparatus comprising the die structure according to claim 7.

12. A light guide plate that is formed by the method according to claim 1.

13. An area light source device comprising:
the light guide plate according to claim 12; and
a light source that is disposed in at least one of end faces of the light guide plate.

14. A liquid crystal display device comprising:
the area light source device according to claim 13; and
a liquid crystal panel.

15. A mobile device comprising the liquid crystal display device according to claim 14.

16. The light guide plate producing method according to claim 1, wherein the projection size of the light introduction part of the post-transfer-molding resin sheet is greater than or equal to ten times the maximum projection size of the light controller in the transfer molding step.

17. The light guide plate producing method according to claim 1, wherein, when the first and second dies are further brought close to each other in the transfer molding process, resin from the light guide plate body of the resin sheet flows into the recess.

18. The die structure according to claim 7, wherein the first and second dies are configured to be brought close to each other such that when the first and second dies are further brought close to each other in the transfer molding process, resin from the light guide plate body of the resin sheet flows into the recess.

* * * * *